United States Patent
Tatesumi et al.

(10) Patent No.: US 12,420,614 B2
(45) Date of Patent: Sep. 23, 2025

(54) ANTI-FOGGING SYSTEM AND CONTROL METHOD

(71) Applicant: TOYOTA JIDOSHA KABUSHIKI KAISHA, Toyota (JP)

(72) Inventors: Yusuke Tatesumi, Seto (JP); Taiki Iida, Toyota (JP)

(73) Assignee: TOYOTA JIDOSHA KABUSHIKI KAISHA, Toyota Aichi-ken (JP)

( * ) Notice: Subject to any disclaimer, the term of this patent is extended or adjusted under 35 U.S.C. 154(b) by 206 days.

(21) Appl. No.: 18/219,957

(22) Filed: Jul. 10, 2023

(65) Prior Publication Data
US 2024/0083215 A1    Mar. 14, 2024

(30) Foreign Application Priority Data
Sep. 13, 2022  (JP) .................................. 2022-145383

(51) Int. Cl.
| | |
|---|---|
| *B60H 1/00* | (2006.01) |
| *G06V 20/59* | (2022.01) |
| *G06V 40/20* | (2022.01) |
| *G10L 15/22* | (2006.01) |

(52) U.S. Cl.
CPC ......... *B60H 1/00742* (2013.01); *G06V 20/59* (2022.01); *G06V 40/20* (2022.01); *G10L 15/22* (2013.01)

(58) Field of Classification Search
CPC .... B60H 1/00742; G06V 20/59; G06V 40/20; G10L 15/22
USPC .......................................................... 701/36
See application file for complete search history.

(56) References Cited

U.S. PATENT DOCUMENTS

| | | | |
|---|---|---|---|
| 9,805,275 | B2 | 10/2017 | Okuda |
| 10,525,981 | B2 | 1/2020 | Matsumura |
| 10,579,056 | B2 | 3/2020 | Matsumura |
| 10,649,452 | B2 | 5/2020 | Ichikawa et al. |
| 10,706,299 | B2 | 7/2020 | Matsumura |
| 10,814,880 | B2 | 10/2020 | Kishi |
| 10,895,875 | B2 | 1/2021 | Hashimoto et al. |
| 10,915,100 | B2 | 2/2021 | Matsushita et al. |
| 11,173,919 | B2 | 11/2021 | De Weser et al. |

(Continued)

FOREIGN PATENT DOCUMENTS

| | | |
|---|---|---|
| JP | 2017-061245 A | 3/2017 |
| JP | 2019094022 A * | 6/2019 |

OTHER PUBLICATIONS

Zhang, Guiying et al. "Investigation on an Improved Heat Pump AC System with the View of Return Air Utilization and Anti-Fogging for Electric Vehicles." Applied thermal engineering 115 (2017): 726-735. Web. (Year: 2017).*

*Primary Examiner* — Ramya P Burgess
*Assistant Examiner* — Keith A von Volkenburg
(74) *Attorney, Agent, or Firm* — Dinsmore & Shohl LLP

(57) ABSTRACT

An anti-fogging system according to the present disclosure includes an anti-fogging device that suppresses fogging of glass of a vehicle, and a control device that controls the anti-fogging device. The control device is configured to execute a process of operating an anti-fogging device when a predetermined condition is satisfied, a process of acquiring information on a conversation situation including at least whether or not a vehicle occupant is talking, and a process of changing a predetermined condition based on information on a conversation situation.

7 Claims, 5 Drawing Sheets

(56) References Cited

U.S. PATENT DOCUMENTS

| | | | |
|---|---|---|---|
| 2014/0318159 A1* | 10/2014 | Eisenhour | B60H 1/3211 62/89 |
| 2014/0338883 A1* | 11/2014 | Watanabe | B60H 3/024 165/59 |
| 2014/0360215 A1* | 12/2014 | Inaba | B60H 1/00485 62/216 |
| 2015/0088374 A1* | 3/2015 | Yopp | B60S 1/0818 701/36 |
| 2018/0370328 A1* | 12/2018 | Krolewski | B60H 1/3207 |
| 2019/0030997 A1* | 1/2019 | Maeda | B60H 1/00785 |
| 2023/0011951 A1* | 1/2023 | Jung | B60H 1/00392 |

* cited by examiner

ANTI-FOGGING SYSTEM AND CONTROL METHOD

CROSS-REFERENCE TO RELATED APPLICATION

This application claims priority to Japanese Patent Application No. 2022-145383 filed on Sep. 13, 2022, incorporated herein by reference in its entirety.

BACKGROUND

1. Technical Field

The present disclosure relates to control of an anti-fogging device suppressing fogging of glass of a vehicle.

2. Description of Related Art

In Japanese Unexamined Patent Application Publication No. 2017-061245 (JP 2017-061245 A), it is disclosed that when it is determined that the elapsed time after turning on the ignition switch is equal to or more than a predetermined time, a compressor for causing a defroster to function is operated.

SUMMARY

Fogging occurred in a windshield or a rear window of a vehicle reduces front and rear visibility of the vehicle as viewed from the inside of the vehicle. However, in an autonomous driving system or a driving support system, information detected by a camera provided in the vehicle through the windshield or the rear window is important information for recognizing the surroundings of the vehicle. Thus, in order to sufficiently ensure performance of the autonomous driving and the driving support, it is desirable to maintain a state in which glass of the vehicle is free from fogging.

However, an anti-fogging device is generally constituted by a heater or air conditioning equipment, and consumes a large amount of electric power. Therefore, it is not desirable that the anti-fogging device is always operated from the viewpoint of fuel consumption and environmental performance. Thus, in the autonomous driving system and the driving support system, the anti-fogging device needs to be operated intensively in a situation in which fogging is likely to occur.

Incidentally, the humidity inside the vehicle greatly affects the occurrence of fogging. Therefore, the situation in which fogging is likely to occur can be considered to be a situation in which the humidity inside the vehicle is increasing. However, it is hardly conceivable that measurement of the humidity is needed for autonomous driving function or driving support function, and it is not desirable to sufficiently provide a high-precision hygrometer in accordance with the structure inside the vehicle, from the viewpoint of cost and design.

It is disclosed in JP 2017-061245 A that an increase in humidity inside the vehicle is detected by paying attention to the elapsed time after the ignition switch is turned on. However, depending on the situation of an occupant of the vehicle, even when the elapsed time after turning on the ignition switch is equal to or more than the predetermined time, there is a possibility that fogging is not likely to occur. As a consequence, the anti-fogging device may operate unnecessarily.

An object of the present disclosure is to provide a technique capable of appropriately operating an anti-fogging device in a situation in which fogging is likely to occur, without a hygrometer being provided, in view of the above issue.

A first aspect of the present disclosure relates to an anti-fogging system.

The anti-fogging system according to the first aspect includes an anti-fogging device configured to suppress fogging of glass of a vehicle, and a control device configured to control the anti-fogging device. The control device is configured to perform: a process of operating the anti-fogging device when a predetermined condition is satisfied; a process of acquiring information about a conversation situation including at least whether conversation is made regarding an occupant of the vehicle; and a process of changing the predetermined condition based on the information about the conversation situation.

A second aspect of the present disclosure relates to a control method of controlling an anti-fogging device suppressing fogging of glass of a vehicle, by a computer.

The control method according to the second aspect includes: operating the anti-fogging device when a predetermined condition is satisfied; acquiring information about a conversation situation including at least whether conversation is made regarding an occupant of the vehicle; and changing the predetermined condition based on the information about the conversation situation.

According to the present disclosure, the predetermined condition for operating the anti-fogging device is changed based on the information about the conversation situation including at least whether conversation is made. As a result, it is possible to make the anti-fogging device operate more easily or with more difficulty in accordance with the conversation situation. Furthermore, it is possible to accurately detect an increase in humidity inside the vehicle, and it is possible that the anti-fogging device is operated appropriately in a situation in which fogging is likely to occur.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, the present embodiment will be described with reference to the drawings.

1. Configuration

Figure 1:
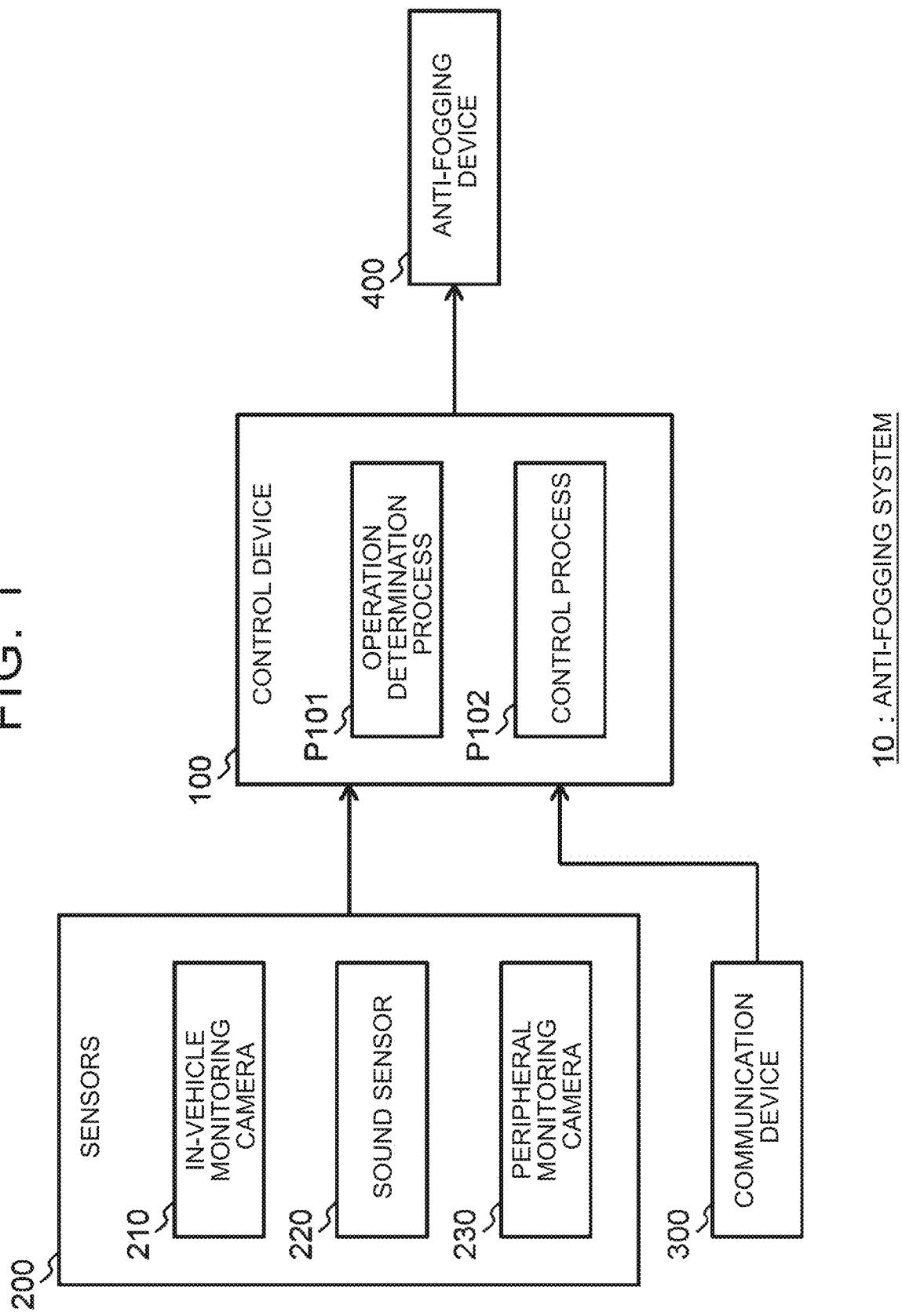
FIG. 1 is a block diagram showing a configuration of an anti-fogging system according to the present embodiment.

FIG. 1 is a block diagram showing a configuration of an anti-fogging system 10 according to the present embodiment. The anti-fogging system 10 detects a situation in which fogging is likely to occur in the glass of the vehicle, and provides a defogging function of operating the anti-fogging device 400. The anti-fogging system 10 includes a control device 100, sensors 200, a communication device 300, and an anti-fogging device 400. Here, the control device 100 is connected to the sensors 200, the communication device 300, and the anti-fogging device 400 so as to be able to transmit information to each other. For example, the control device 100 is connected to these devices via an in-vehicle network configured by CAN (Control Area Network).

Figure 2:
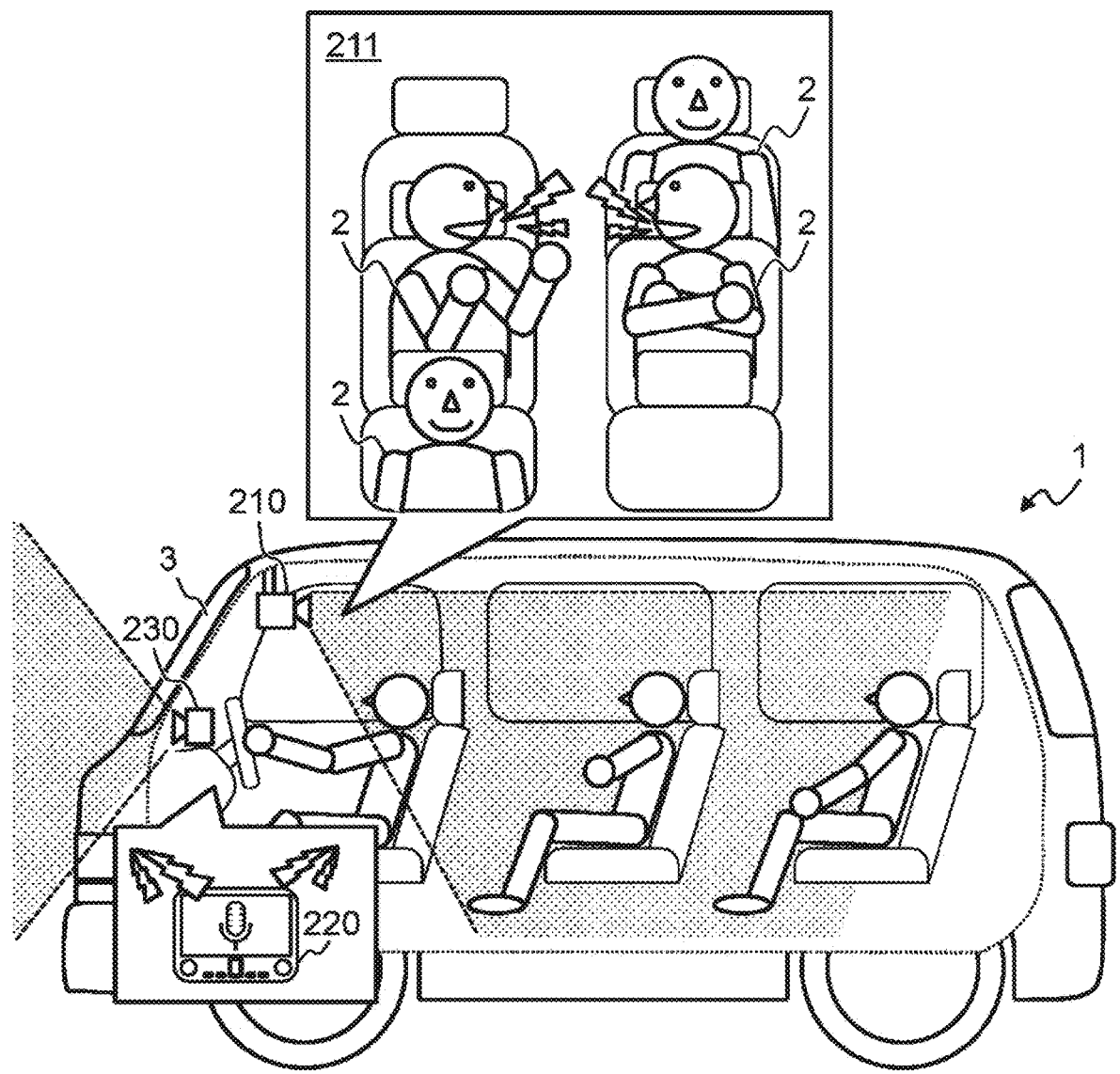
FIG. 2 is a block diagram illustrating an example of a configuration of a vehicle to which the anti-fogging system according to the present embodiment is applied.

The sensors 200 are provided in the vehicle and detect a traveling state of the vehicle and an environment inside and outside the vehicle. The sensors 200 include an in-vehicle monitoring camera 210, a sound sensor 220, and a peripheral monitoring camera 230. With reference to FIG. 2, the in-vehicle monitoring camera 210, the sound sensor 220, and the peripheral monitoring camera 230 will be described.

FIG. 2 is a conceptual diagram illustrating an example of a configuration of the vehicle 1 to which the anti-fogging system 10 is applied with respect to the in-vehicle monitoring camera 210, the sound sensor 220, and the peripheral monitoring camera 230.

The in-vehicle monitoring camera 210 is a camera that captures an image of a situation inside the vehicle 1. In particular, the in-vehicle monitoring camera 210 is arranged so as to be able to capture an image of the situation of the occupant 2 of the vehicle 1 (the occupant 2 may be one). The detection information output from the in-vehicle monitoring camera 210 may be captured video data or information obtained by image recognition of the captured video data. In the latter case, the in-vehicle monitoring camera 210 is configured to output information about the conversation situation of the occupant 2 of the vehicle 1. Here, the information on the conversation situation includes at least information on whether or not the occupant 2 of the vehicle 1 is talking. For example, the in-vehicle monitoring camera 210 detects whether or not the occupant 2 of the vehicle 1 is talking by acquiring, by image recognition, a change in the expression of the occupant 2 of the vehicle 1, a movement of the mouth, and an opening amount appearing in the captured video data. In addition, as the information related to the conversation state output by the in-vehicle monitoring camera 210, the number of occupants 2 who are talking, the position of the occupant 2 who is talking, and the like are exemplified. FIG. 2 illustrates an example 211 of video data captured by the in-vehicle monitoring camera 210. In this case, the in-vehicle monitoring camera 210 outputs, for example, the fact that the two occupants 2 are talking as detection information.

The in-vehicle monitoring camera 210 can divert a driver monitor provided for autonomous driving or driving assistance functions and a drive recorder for capturing an image of the inside of the vehicle. However, it may be a camera provided for configuring the anti-fogging system 10.

The sound sensor 220 is a sensor that detects a sound inside the vehicle 1. The detection information output by the sound sensor 220 is typically audio data obtained by encoding the detected audio.

The sound sensor 220 can use an audio device having a microphone function or a hands-free system having a voice recognition function. However, it may be a microphone provided for configuring the anti-fogging system 10.

The peripheral monitoring camera 230 is a camera that captures an image of a situation around the vehicle 1. Typically, the peripheral monitoring camera 230 images a situation around the vehicle 1 through a windshield or a rear window. In FIG. 2, a camera that captures an image of a situation in front of the vehicle 1 through the windshield 3 is illustrated as the peripheral monitoring camera 230. The detection information output from the peripheral monitoring camera 230 may be captured video data or information obtained by image recognition of the captured video data.

The peripheral monitoring camera 230 can divert cameras provided for autonomous driving and driving support functions. However, it may be a camera provided for configuring the anti-fogging system 10.

Thus, the anti-fogging system 10 includes sensors 200. The detection information output from the sensors 200 is transmitted to the control device 100.

Refer once again to FIG. 1. The communication device 300 is a device that communicates with a device outside the vehicle 1 and transmits and receives information. For example, the communication device 300 connects to the Internet via a mobile communication network and communicates with a server on the Internet. Examples of the information received by the communication device 300 include weather information, weather information, map information, and road traffic information around the vehicle 1. Information received by the communication device 300 is transmitted to the control device 100.

The control device 100 executes processing related to the antifogging function based on the information to be acquired. In particular, the control device 100 is configured to execute an operation determination process P101 and a control process P102 as processes related to the anti-fogging function.

The operation determination process P101 is a process of determining whether or not to operate the anti-fogging device 400. In particular, the control device 100 determines to operate the anti-fogging device 400 when the predetermined condition is satisfied in the operation determination process P101. Here, the predetermined condition is typically that a specific state value for the vehicle 1 exceeds a predetermined threshold value. The specific state value is generally a value related to the state of fogging occurring in the glass of the vehicle 1. For example, the specific state value may be a numerical value (for example, 0% to 100%) of the degree of haze of the windshield 3. In this case, for example, in the operation determination process P101, the control device 100 determines that the predetermined condition is satisfied when the degree of haze of the windshield 3 exceeds 20%. The degree of cloudiness of the windshield 3 can be obtained, for example, by image recognition of video data acquired from the peripheral monitoring camera 230.

Other specific state values for the vehicle 1 include a temperature difference between the inside and outside of the vehicle 1, an elapsed time after the anti-fogging device 400 is stopped, and the like. In particular, the particular state value may be a value subject to threshold determination employed in conventional anti-fogging systems that threshold control the anti-fogging device. The predetermined condition may be given by a combination of a plurality of state values. For example, the predetermined condition may be given that the degree of haze of the windshield 3 exceeds 20% and/or that the temperature difference between the inside and outside of the vehicle 1 exceeds 5 degrees. The threshold may also have a hysteresis width.

In this way, typically, it may be a predetermined condition that a specific state value for the vehicle 1 exceeds a predetermined threshold value. In the following description, a specific state value for the vehicle 1 will be referred to as a "cloudy state value".

The control device 100 is further configured to acquire, in the operation determination process P101, information on the conversation status of the occupant 2 of the vehicle 1, and change a predetermined condition based on the information on the conversation status.

Here, the information on the conversation situation includes at least information on whether or not the occupant 2 of the vehicle 1 is talking. In addition, as the information on the conversation situation, information such as the number of occupants 2 who are talking, the duration of the conversation, the volume of the conversation, and the like is exemplified. The control device 100 acquires information on the conversation status by, for example, image recognition of video data acquired from the in-vehicle monitoring camera 210 and analysis of audio data acquired from the sound sensor 220. Alternatively, the control device 100 may be configured to acquire information about a conversation situation as detection information of the sensors 200. The change of the predetermined condition is typically a change of a threshold value related to the fogging state value. Changing the predetermined conditions may make the anti-fogging device 400 easier or less likely to operate.

The inventors of the present disclosure have found that the increase in humidity in the vehicle interior of the vehicle 1 is highly dependent on the conversation situation of the occupant 2 of the vehicle 1. Especially, the humidity in the car differs greatly between the case in which the occupant 2 is talking and the case in which it is not talking. According to the present embodiment, by changing a predetermined condition based on information on a conversation situation including at least whether or not a conversation is being made, it is possible to make the anti-fogging device 400 easy to operate or difficult to operate in accordance with the conversation situation. Accordingly, it is possible to accurately detect an increase in humidity inside the vehicle, and to appropriately operate the anti-fogging device 400 in a situation where fogging is likely to occur.

As an example, the control device 100 changes the predetermined condition in the operation determination process P101 based on the information regarding the conversation situation as follows.

First, the control device 100 estimates the expiratory volume of the occupant 2 of the vehicle 1 based on the information on the conversation situation. For example, the control device 100 can estimate the amount of exhaled air per unit time (for example, one minute) from a value obtained by numerically integrating the volume of the conversation with the duration of the conversation and correcting the value with the number of the occupants 2 who are talking. In this case, estimating the expiratory volume may be referred to as calculating the conversation volume.

Then, the control device 100 changes a predetermined condition so that the anti-fogging device 400 is more likely to operate as the estimated expiratory volume increases. For example, the control device 100 decreases the threshold value related to the cloudy state value as the estimated expiratory volume increases.

The expiratory volume of the occupant 2 of the vehicle 1 directly affects the humidity inside the vehicle. Therefore, as the amount of exhaled air estimated based on the information on the conversation situation increases, the anti-fogging device 400 can be easily operated, so that it is possible to detect an increase in humidity in the vehicle with higher accuracy and realize the operation of the anti-fogging device 400 at an appropriate timing.

The control device 100 may be further configured to acquire weather information about the surroundings of the vehicle 1 in the operation determination process P101 and change a predetermined condition based on the weather information. For example, when the weather around the vehicle 1 is rain, the control device 100 further reduces the threshold value related to the cloudy state value.

The control device 100 can obtain weather information about the surroundings of the vehicle 1 by, for example, image recognition of video data acquired from the peripheral monitoring camera 230. Alternatively, the control device 100 may be configured to obtain weather information from the communication device 300.

The weather around the vehicle 1 serves as an index for determining the humidity inside the vehicle in a state in which the occupant 2 is not speaking. For example, when the surroundings of the vehicle 1 are rain or snow, it is known that the humidity inside the vehicle is higher than in the case of sunny weather. From this, it is considered that the humidity inside the vehicle is somewhat different when the weather around the vehicle 1 is different even if the conversation situation of the occupant 2 is the same. Therefore, by changing the predetermined condition based on the weather information, it is possible to realize the detection of the increase in the humidity in the vehicle with higher accuracy and the operation of the anti-fogging device 400 at an appropriate timing.

The control process P102 is a process for generating a control signal for the anti-fogging device 400 in accordance with the processing result of the operation determination process P101. If it is determined in the operation determination process P101 that the anti-fogging device 400 is not to be operated, the control device 100 generates a control signal for stopping the anti-fogging device 400 in the control process P102. On the other hand, when it is determined that the anti-fogging device 400 is to be operated in the operation determination process P101, the control device 100 generates a control signal for operating the anti-fogging device 400 in the control process P102. For example, when the anti-fogging device 400 is configured by heaters that cause a heating element such as a heating wire to generate heat, the control device 100 generates a control signal indicating the amount of heat generated by the heating element in the control process P102. Further, for example, when the anti-fogging device 400 is constituted by an air conditioning facility, the control device 100 generates a control signal for controlling the inside air/outside air of the air conditioning facility in the control process P102.

Here, the control device 100 may be configured to generate a control signal in the control process P102 based on the detection information acquired from the sensors 200 and the processing result of the operation determination process P101. For example, the control device 100 generates a control signal indicating a larger calorific value as the amount of exhaled air estimated in the operation determination process P101 increases.

The anti-fogging device 400 operates in accordance with a control signal output from the control device 100. The anti-fogging device 400 may also be referred to as a defroster or a defogger. The anti-fogging device 400 is typically constituted by a heater or an air conditioner for the windshield 3 or the rear window of the vehicle 1. However, the anti-fogging device 400 may adopt a suitable mode depending on the environment to which the anti-fogging system 10 is applied. The anti-fogging device 400 operates in accordance with a control signal, so that the defogging function of the anti-fogging system 10 is realized.

As described above, the anti-fogging system 10 according to the present embodiment is configured.

Figure 3:
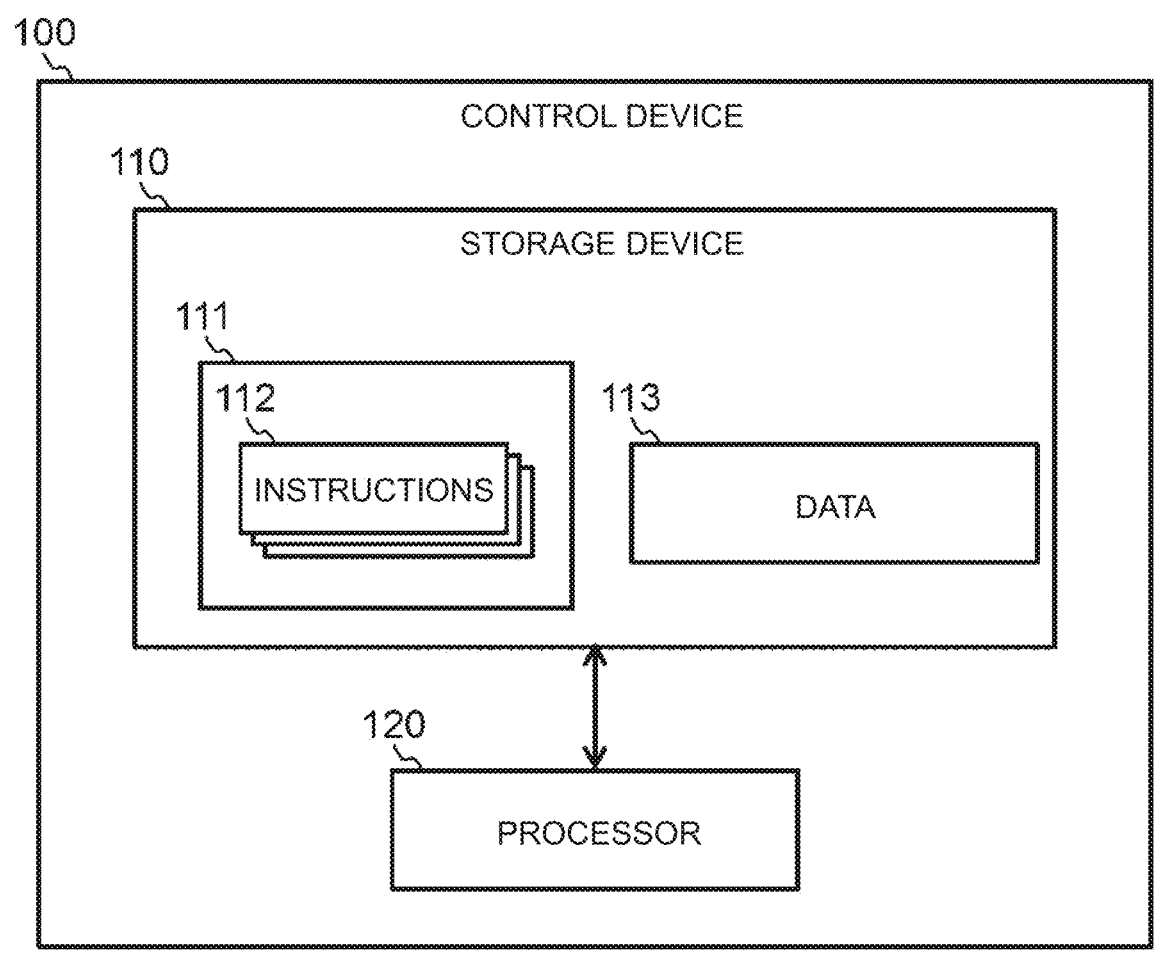
FIG. 3 is a block diagram illustrating a configuration of a control device according to the present embodiment.

Next, the configuration of the control device 100 according to the present embodiment will be described with reference to FIG. 3. FIG. 3 is a block diagram illustrating an example of the control device 100.

The control device 100 is a computer including a storage device 110 and a processor 120. The storage device 110 can be constituted by a recording medium such as a ROM, RAM, HDD, SSD. The processor 120 can be configured by a CPU or the like including an arithmetic device, a register, and the like. The control device 100 includes, for example, one or a plurality of ECU (Electronic Control Unit).

The storage device 110 is coupled to the processor 120 and stores a plurality of instructions 112 executable by the processor 120 and various types of data 113 necessary for executing processing.

The plurality of instructions 112 is provided by the computer program 111. In addition, the plurality of instructions 112 are configured to cause the processor 120 to execute a process related to an anti-fogging function. That is, the operation of the processor 120 in accordance with the plurality of instructions 112 realizes the operation determination process P101 and the control process P102. The data 113 includes information acquired by the control device 100, parameter information of the computer program 111, and the like.

As described above, the control device 100 according to the present embodiment can be configured.

2. Processing

Processing related to the anti-fogging function executed by the control device 100 will be described below.

Figure 4:
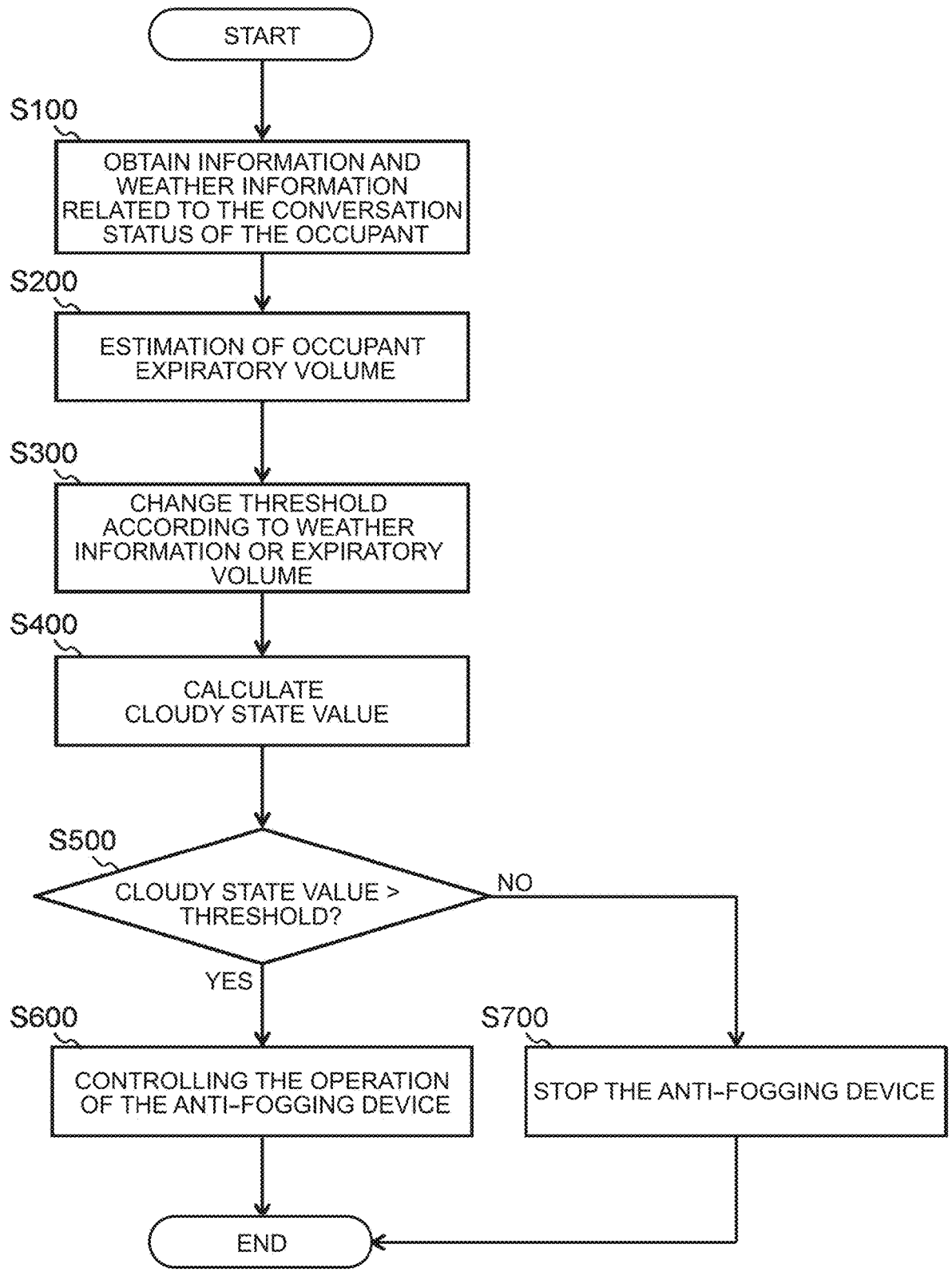
FIG. 4 is a flowchart illustrating a process executed by the control device according to the present embodiment.

FIG. 4 is a flowchart illustrating an example of a process executed by the control device 100, more specifically, a process executed by the processor 120. The process according to the flowchart illustrated in FIG. 4 starts, for example, when the ignition switch of the vehicle 1 is turned on, and is repeatedly executed at predetermined intervals.

In S100, the control device 100 acquires information on the conversation status of the occupant 2 of the vehicle 1 and weather information.

Next, in S200, the control device 100 estimates the expiratory volume of the occupant 2 of the vehicle 1 on the basis of the information regarding the conversation status.

Next, in S300, the control device 100 changes the thresholds related to the cloudy condition of the vehicle 1 in accordance with the weather data acquired in S100 or the expiratory volume estimated in S200. In particular, the control device 100 decreases the threshold so that the anti-fogging device 400 is more likely to operate as the estimated expiratory volume increases.

Next, in S400, the control device 100 calculates a cloudy state value based on the acquired information.

Next, in S500, the control device 100 determines whether the haze condition calculated in S400 exceeds a threshold.

If the fogging status value exceeds the threshold (S500; Yes), the control device 100 determines to operate the anti-fogging device 400 and S600 the anti-fogging device 400. If the fog status value does not exceed the threshold (S500; No), the control device 100 stops the anti-fogging device 400 (S700).

As described above, the control device 100 executes a process related to the defogging function. In addition, the control device 100 executes the processing in this manner, thereby realizing a control method in which the control of the anti-fogging device 400 is performed by the computer.

3. Examples

Hereinafter, an embodiment of the anti-fogging system 10 according to the present embodiment will be described with reference to FIG. 5.

Figure 5:
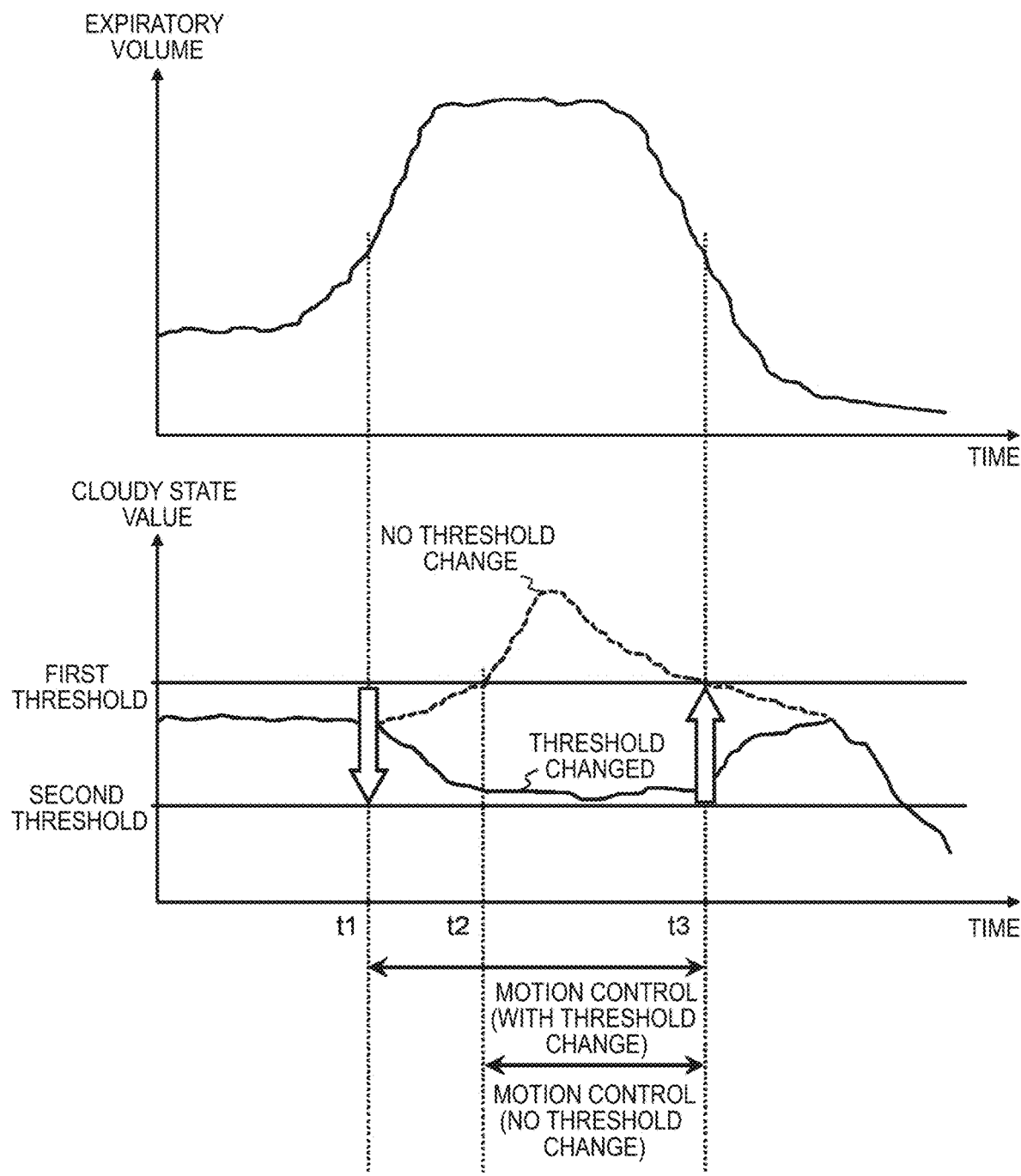
FIG. 5 is a diagram illustrating an example of an anti-fogging system according to the present embodiment.

FIG. 5 shows, as an example, a graph representing a temporal change in the estimated expiratory volume and a graph representing a temporal change in the cloudy state value. In particular, the graph representing the temporal change of the fogging state value shows a case where the anti-fogging system 10 according to the present embodiment is applied (with a threshold change and a solid line) and a case where the defogging state value is not applied (without a threshold change and a broken line). Here, in both graphs, the horizontal axis indicating the lapse of time coincides with each other. FIG. 5 shows a case where the control device 100 changes the threshold value related to the cloudy state value between the first threshold value and the second threshold value in accordance with the estimated expiratory volume.

When the anti-fogging system 10 according to the present embodiment is not applied, the anti-fogging device 400 does not operate until the defogging state value exceeds the first threshold value. Therefore, as shown in FIG. 5, there is a possibility that the operation of the anti-fogging device 400 is delayed with respect to the increase in the humidity inside the vehicle, and the fogging state value is excessively increased. As a result, there is a possibility that the performance of the automatic driving or the driving support cannot be sufficiently secured. When the threshold value relating to the fogging state value is set as the second threshold value, the anti-fogging device 400 may be unnecessarily operated even when an increase in humidity in the vehicle is not expected, and thus the fuel consumption and the environmental performance may be deteriorated.

On the other hand, when the anti-fogging system 10 according to the present embodiment is applied, in the time t1, the control device 100 lowers the threshold value related to the fogging condition value from the first threshold value to the second threshold value because the estimated exhalation amount is increased. As a result, the fogging state value exceeds the threshold value, and the control device 100 starts the control of the anti-fogging device 400. Accordingly, even when the expiratory volume is further increased after the time t1 and an increase in the humidity in the vehicle is expected, the anti-fogging device 400 can be appropriately operated without increasing the fogging state value.

Then, in the time t3, the control device 100 increases the threshold value related to the cloudy condition value from the first threshold value to the second threshold value because the estimated exhalation amount is reduced. As a result, the control device 100 stops the anti-fogging device 400 because the fogging state value becomes smaller than the threshold value. This prevents the anti-fogging device 400 from operating unnecessarily when the expiratory volume is small after the time t3 and there is no fear of an increase in the humidity of the vehicles.

As described above, according to the present embodiment, the anti-fogging device 400 can be appropriately operated in a situation where fogging is likely to occur without providing a hygrometer. Further, the anti-fogging system 10 according to the present embodiment can be applied by diverting the configuration of a conventional automated driving system or a driving support system. In the above embodiment, a case is shown in which the threshold value related to the fogging state value is changed between the first threshold value and the second threshold value. For example, the control device 100 may be configured to change the threshold value in more stages according to the expiratory volume, or may be configured to change the threshold value according to a map that provides a threshold value for the expiratory volume.

What is claimed is:

1. An anti-fogging system comprising: an anti-fogging device including a heater and/or an air-conditioner, the anti-fogging device configured to suppress fogging of glass of a vehicle; and a control device configured to control the anti-fogging device, wherein the control device is configured to perform:
   a process of operating the anti-fogging device when a predetermined condition is satisfied;
   a process of acquiring information about a conversation situation including at least whether an occupant of the vehicle is talking by performing image recognition of the occupant; and
   a process of changing the predetermined condition based on the information about the conversation situation.

2. The anti-fogging system according to claim 1, wherein the process of changing the predetermined condition includes:
   estimating an expiratory volume of the occupant based on the information about the conversation situation; and
   changing the predetermined condition such that the operation of the anti-fogging device is changed as the expiratory volume increases.

3. The anti-fogging system according to claim 2, wherein:
   the predetermined condition is that one or more specific state values for the vehicle exceed a predetermined threshold value;
   the information about the conversation situation further includes the number of the occupants making the conversation, duration of the conversation, and volume of the conversation; and
   changing the predetermined condition is to change the threshold value.

4. The anti-fogging system according to claim 1, wherein the control device is further configured to perform:
   a process of acquiring weather information around the vehicle; and
   a process of changing the predetermined condition based on the weather information.

5. The anti-fogging system according to claim 1, wherein the process of acquiring information about the conversation situation including at least whether the occupant of the vehicle is talking by performing image recognition of the occupant includes a change in an expression of the occupant, a movement of a mouth of the occupant, or an opening amount of the mouth of the occupant.

6. A control method of controlling an anti-fogging device suppressing fogging of glass of a vehicle, by a computer, the control method comprising:
   operating the anti-fogging device when a predetermined condition is satisfied;
   acquiring information about a conversation situation including at least whether an occupant of the vehicle is talking by performing image recognition of the occupant; and
   changing the predetermined condition based on the information about the conversation situation.

7. The control method according to claim 6, wherein acquiring information about the conversation situation including at least whether the occupant of the vehicle is talking by performing image recognition of the occupant includes a change in an expression of the occupant, a movement of a mouth of the occupant, or an opening amount of the mouth of the occupant.

* * * * *